United States Patent
Sheikh et al.

(10) Patent No.: US 10,930,286 B2
(45) Date of Patent: Feb. 23, 2021

(54) METHOD AND SYSTEM FOR MUTING CLASSIFIED INFORMATION FROM AN AUDIO

(71) Applicant: Tata Consultancy Services Limited, Mumbai (IN)

(72) Inventors: Imran Ahamad Sheikh, Thane (IN); Sunil Kumar Kopparapu, Thane (IN); Bhavikkumar Bhagvanbhai Vachhani, Thane (IN); Bala Mallikarjunarao Garlapati, Hyderabad (IN); Srinivasa Rao Chalamala, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 127 days.

(21) Appl. No.: 16/254,387

(22) Filed: Jan. 22, 2019

(65) Prior Publication Data
US 2020/0020340 A1    Jan. 16, 2020

(30) Foreign Application Priority Data
Jul. 16, 2018    (IN) .............................. 201821026473

(51) Int. Cl.
*G10L 15/00* (2013.01)
*G10L 15/22* (2006.01)
(Continued)

(52) U.S. Cl.
CPC ............ *G10L 15/222* (2013.01); *G06F 3/165* (2013.01); *G06N 7/023* (2013.01); *G06N 7/026* (2013.01);
(Continued)

(58) Field of Classification Search
None
See application file for complete search history.

(56) References Cited

U.S. PATENT DOCUMENTS

| | | | |
|---|---|---|---|
| 6,236,964 B1 * | 5/2001 | Tamura ................... | G10L 15/10 704/254 |
| 7,650,282 B1 * | 1/2010 | Morris ................... | G10L 15/187 379/88.01 |

(Continued)

FOREIGN PATENT DOCUMENTS

EP    3123705    2/2017

*Primary Examiner* — Douglas Godbold
(74) *Attorney, Agent, or Firm* — Finnegan, Henderson, Farabow, Garrett & Dunner, L.L.P.

(57) ABSTRACT

This disclosure relates generally to a method and system for muting of classified information from an audio using a fuzzy approach. The method comprises converting the received audio signal into text using a speech recognition engine to identify a plurality of classified words from the text to obtain a first set of parameters. Further, a plurality of subwords associated with each classified word are identified to obtain a second set of parameters associated with each subword of corresponding classified word. A relative score is computed for each subword associated with the classified word based on a plurality of similar pairs for the corresponding classified word. A fuzzy muting function is generated using the first set of parameters, the second set of parameters and the relative score associated with each subword. The plurality of subwords associated with each classified word is muted in accordance with the generated fuzzy muting function.

9 Claims, 8 Drawing Sheets

(51) Int. Cl.
*G06F 3/16* (2006.01)
*G06N 7/02* (2006.01)
*G10L 15/06* (2013.01)
*G10L 25/33* (2013.01)
*G10L 25/48* (2013.01)
*G10L 25/87* (2013.01)

(52) U.S. Cl.
CPC ............ *G10L 15/063* (2013.01); *G10L 25/33* (2013.01); *G10L 25/48* (2013.01); *G10L 25/87* (2013.01)

(56) References Cited

U.S. PATENT DOCUMENTS

| | | | |
|---|---|---|---|
| 2006/0095262 A1* | 5/2006 | Danieli | G10L 15/08 704/251 |
| 2007/0016419 A1* | 1/2007 | Lee | G10L 15/04 704/250 |
| 2007/0271241 A1* | 11/2007 | Morris | G10L 15/26 |
| 2008/0184284 A1* | 7/2008 | O'Hern | H04N 21/233 725/28 |
| 2008/0221882 A1* | 9/2008 | Bundock | G10L 15/26 704/235 |
| 2008/0221893 A1* | 9/2008 | Kaiser | G09B 19/04 704/257 |
| 2010/0217596 A1* | 8/2010 | Morris | G10L 15/10 704/251 |
| 2010/0324900 A1* | 12/2010 | Faifkov | G10L 15/12 704/254 |
| 2011/0131043 A1* | 6/2011 | Adachi | G10L 15/08 704/246 |
| 2011/0218798 A1* | 9/2011 | Gavalda | G10L 17/00 704/201 |
| 2012/0027195 A1 | 2/2012 | Shaffer et al. | |
| 2013/0035936 A1* | 2/2013 | Garland | G10L 15/26 704/235 |
| 2013/0266127 A1* | 10/2013 | Schachter | H04M 3/5175 379/88.01 |
| 2015/0278534 A1 | 10/2015 | Thiyagarajan et al. | |
| 2018/0197532 A1* | 7/2018 | Rajendran | G10L 15/08 |

* cited by examiner

METHOD AND SYSTEM FOR MUTING CLASSIFIED INFORMATION FROM AN AUDIO

PRIORITY CLAIM

This U.S. patent application claims priority under 35 U.S.C. § 119 to: India Application No. 201821026473, filed on Jul. 16, 2018. The entire contents of the aforementioned application are incorporated herein by reference.

TECHNICAL FIELD

The disclosure herein generally relates to data privacy or data security of sensitive data or classified information, and, more particularly, to secure classified information in an audio by muting audio segments corresponding to the classified information.

BACKGROUND

Data privacy and security is a major concern while performing a transaction in an outsourced business process industry. Moreover, several enterprises, managing business process, interact with customer and generate additional information in the form of conversational or audio (audio signal) recordings, chat transcripts, agent logs and the like. Particularly, in the context of voice based business process, an external agent may collect sensitive or private or classified information of a customer such as a social security number (SSN), a bank account number, a credit card number, a telephone number etc. for various transactions that get recorded. These audio recordings retain all sensitive information provided by the customer. Substantially, these enterprises procure large volumes of audio recordings stored in archives for various intent such as quality analysis, auditing, mining, training and learning.

Ensuring privacy and security of these audio recordings can be extremely difficult, specifically when the business process are managed by third parties. Inherently, these audio recordings pose a potential privacy risk because an unauthorized agent can exploit the sensitive information associated with the audio recordings. In order to ensure the privacy of any classified information such as sensitive information, private or personal information associated with the audio conversation, enterprises limit the access of audio recordings to any unauthorized agent. However, with this solution to protect classified information, shareability and usability of other information associated with the audio recordings is also blocked. Another approach is to enable usage and sharing of the recorded audio signals to third party relies by muting or masking sensitive data or classified information.

In an existing method, a technique is used to automatically edit multimedia recordings associated with call center session held between a caller and a call center agent. The multimedia recordings from the session is further analyzed to determine when sensitive information is to be revealed. Further, the multimedia recordings are edited to mask the sensitive information associated with the recorded copy of the multimedia. This existing technique masks or mute the sensitive information based on a predefined policy information, wherein the predefined policy information is the format of sensitive information associated with the multimedia recordings. The trigger indicators triggers the audio that contains sensitive information to be masked and also edits the audio signal by quieting wherein, no audio is available during that portion of the audio recordings to monitor for quality assurance. This is a conventional approach and describing the entire platform of monitoring call audio, agent computer screen, etc. for muting sensitive information on each of these modalities. However the conventional approach makes a broad reference to voice analytics and does not describe on the specifics of audio muting.

In another existing method, a threshold based approach is used to identify and mute the sensitive information. The threshold based approach sets a predefined threshold criteria for a confidentiality score computed for each segment of the audio signal being analyzed and the segment above the confidentiality threshold is muted. This existing approach is static, and in practical scenarios if segments of the audio that may carry sensitive information if fall below the threshold remain unmuted and may be leaked. This leak may be critical for highly sensitive information.

SUMMARY

Embodiments of the present disclosure present technological improvements as solutions to one or more of the above-mentioned technical problems recognized by the inventors in conventional systems. For example, in one embodiment, a method for muting segments of classified information from an audio is provided. The method comprises receiving an audio signal as input from a plurality of recorded audio signals. The received audio signal is converted into text using a speech recognition engine. Further, a plurality of classified words are identified from the text using a speech recognition engine. Further, a first set of parameters associated with each classified word are obtained among the plurality of classified words, wherein the first set of parameters comprises a time stamp of each classified word, a duration for each classified word occurred and a confidence score of each classified word. Furthermore, a plurality of subwords are identified associated with each classified word. Further, a second set of parameters associated with each subword are obtained among the plurality of subwords of corresponding classified word among the plurality of classified words, wherein the second set of parameters comprises a time stamp of each subword, a duration for which each subword occurred and a subword confidence score associated with each classified word.

Further, a relative score is computed for each subword associated with the corresponding classified word based on a plurality of similar pairs for the corresponding classified word. Here, a list of words phonetically similar to the corresponding classified word are obtained using a language lexicon. Then, the plurality of similar pairs are obtained by pairing the obtained list of words at the subword level and a count is determined for the plurality of word level similar pairs. The plurality of similar pairs are clustered into a plurality of clusters based on a predefined cluster criteria for each subword associated with the corresponding classified word, wherein each cluster among the plurality of clusters comprises a set of subword level similar pairs and the relative score is determined for each subword associated with the corresponding classified word, wherein the relative score is a ratio of plurality of clustered subword level similar pairs based on a predefined cluster criteria to the count of the plurality of word level similar pairs. Further, a fuzzy muting function is generated utilizing the first set of parameters, the second set of parameters and the relative score associated with each subword. Then, the plurality of subwords associated with each classified word are muted in accordance with the generated fuzzy muting function.

In another aspect, a system for muting segments of classified information from an audio is provided. The system comprises a data acquisition unit to receive an audio signal as input from the plurality of recorded audio signalsThe conversion module is configured to convert the received audio signal into text using a speech recognition engine. The classified word detection module is configured to process the converted text to identify a plurality of classified words from a plurality of predefined classified words repository to obtain a first set of parameters associated with each classified word among the plurality of classified words. The first set of parameters comprises a time stamp of each classified word, a duration of each classified word occurred and a classified confidence score of each classified word. The subwords module is configured to identify a plurality of subwords associated with each classified word to obtain a second set of parameters associated with each subword among the plurality of subwords. The second set of parameters comprises a time stamp of each subword, a duration of each subword occurred and a subword confidence score associated with each classified word. Further, a relative score is computed for each identified subword associated with the classified word based on a plurality of similar pairs for the classified word. Here, a list of words phonetically similar to the corresponding classified word are obtained using a language lexicon and the plurality of similar pairs are obtained by pairing the obtained list of words. Then, a count is determined for the plurality of word level similar pairs. Further, the plurality of similar pairs are clustered into a plurality of clusters based on a predefined cluster criteria for each subword associated with the corresponding classified word, wherein each cluster among the plurality of clusters comprises a set of subword level similar pairs and the the relative score is determined for each subword associated with the corresponding classified word, wherein the relative score is a ratio of plurality of clustered subword level similar pairs based on a predefined cluster criteria to the count of the plurality of word level similar pairs. The fuzzy muting module is configured to generate a fuzzy muting function using the first set of parameters, the second set of parameters and the relative score associated with each subword. Further, the plurality of subwords associated with each classified word is muted in accordance with the generated fuzzy muting function with an appropriate degree of obfuscation signal.

In yet another embodiment, provides one or more non-transitory machine readable information storage mediums comprising one or more instructions, which when executed by one or more hardware processors perform actions including receiving an audio signal from the data source and then converting the received audio signal into text using a speech recognition engine. Further, a plurality of classified words are identified from the text using a repository of predefined classified words to obtain a first set of parameters associated with each classified word among the plurality of classified words. Furthermore, a plurality of subwords associated with each classified word are identified to obtain a second set of parameters associated with each subword among the plurality of subwords of corresponding classified word among the plurality of classified words. Then, a relative score is computed for each subword associated with the corresponding classified word based on a plurality of similar pairs for the corresponding classified word. Further, a fuzzy muting function is generated using the first set of parameters, the second set of parameters and the relative score associated with each subword and the plurality of subwords associated with each classified word are muted in accordance with the generated fuzzy muting function.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provides a method and system for muting classified information from an audio signal. The classified information herein refers to any confidential, private and sensitive data in the audio signal that needs to be secured against unauthorized access. The system, alternatively referred as information muting system, provides data protection by automatically muting segments of the audio signal corresponding to classified information within the audio signal based on a fuzzy approach, wherein the information muting system dynamically, on the fly, generates fuzzy muting function for the audio being analyzed. This generated fuzzy muting function is unique or specific to the corresponding audio being analyzed. The fuzzy muting function does not rely on static threshold based approach, as used in existing methods. The fuzzy function, so generated, being specific to the audio, adds to the accuracy of muting the right information. The fuzzy muting function is generated by analyzing the audio at subword level further enhancing accuracy of desired muting process. The generated fuzzy function when operated on the audio signal being analyzed, provides an output audio signal with classified information muted, wherein muting is in accordance with the generated fuzzy function.

The analysis of the audio signal at subword level is critical as archives of audio recordings (audio signals) such as call conversations are typically used to train speech recognition engines and other machine learning algorithms. Muting classified words/phrases in these recordings leads to missing information or gaps in the training data. The sub-word level fuzzy muting can make use of domain specific similar pairs (or similar sounding words) and mute only certain sub-word unit(s) such that after muting any word/phrase corresponding to the classified information, sounds more similar to another domain related word. This alleviates the problem of missing information and gaps when using muted audio archives as training data.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

Figure 1:
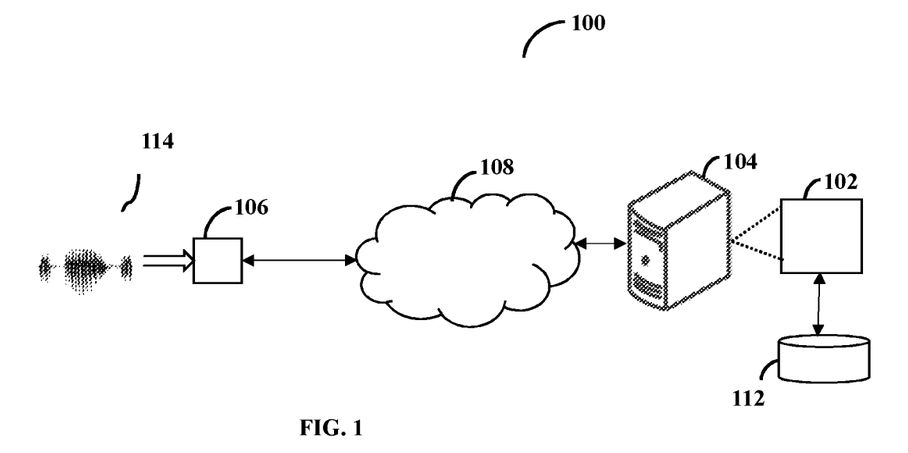
FIG. 1 illustrates an exemplary system implementing an information muting system, according to some embodiments of the present disclosure.
Figure 2:
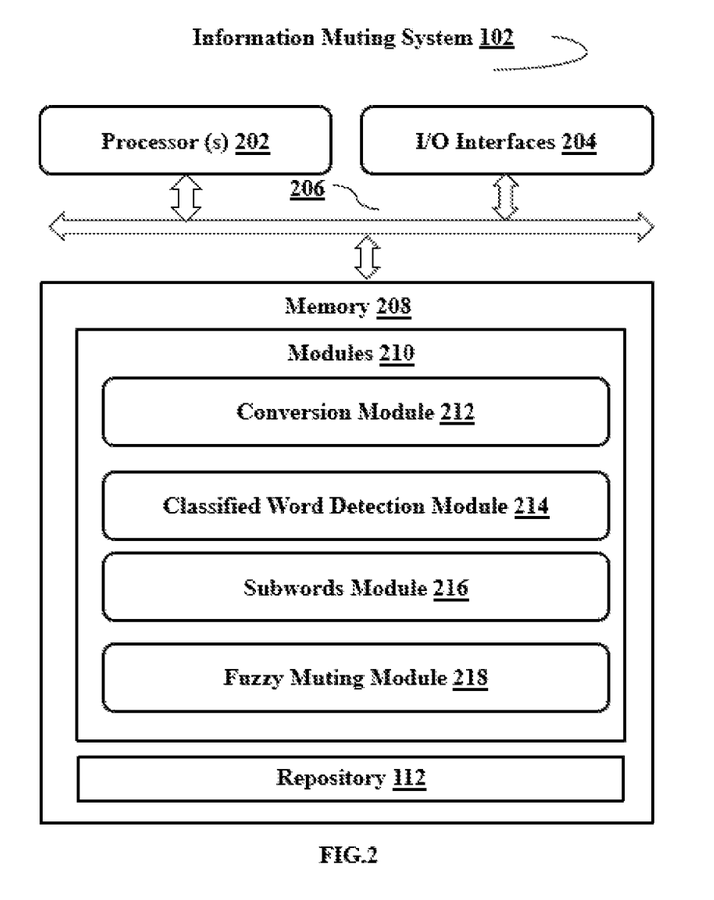
FIG. 2 illustrates a functional block diagram of the information muting system of FIG. 1, according to some embodiments of the present disclosure.

FIG. 1 illustrates an exemplary system 100 implementing an information muting system 102 to process the recorded audio signal to mute the classified information in accordance with an embodiment of the present subject matter. The system 100, interchangeably referred as information muting system, depicts a data source 106, which is a source of a plurality of audio signals recorded and stored in one or more databases. The information muting system 102, implemented in a computing device 104, may receive the plurality of audio signals corresponding to recorded conversation of one or more subjects. The information muting system 102 may be externally coupled (as shown in FIG. 1) to the computing device 104 or may be internal (not shown) to the computing device 104. The plurality of received audio signals may be stored in a repository 112. The repository 112 may be external to the information muting system 102 or internal to the information muting system 102 (as shown in FIG. 2). The repository 112, coupled to the information muting system 102, may store other data such as a lexicon language repository and a classified words repository utilized during the classified information muting process. In an embodiment, the data source 106 may be directly connected to the information muting system 102 based on the reception of the plurality of audio signals, to be analyzed. The received audio signals are further processed to identify the segments of the audio signal corresponding to the classified information and generate the fuzzy muting function to mute the identified segments. Further, the segments corresponding to the identified classified information are muted using the fuzzy muting function with an appropriate degree of muting or obfuscation signal obtained from the derived fuzzy muting function. The degree of muting/obfuscation is proportional to parameters like confidence score, durations and the like and is decided by the mathematical function used to realize the fuzzy muting function. The window functions that includes a Gaussian window function, a Kaiser Window function and the like may be utilized for deriving the mathematical function.

In an embodiment, a network 108, transmitting audio signals from the data source 106 to the computing device 104, may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the information muting system 102 through communication links. In an embodiment, the computing device 104, which implements the information muting system 102 can be a workstation, a mainframe computer, a general purpose server, a network server or the like.

FIG. 2 illustrates a functional block diagram of the information muting system 102 of FIG. 1, according to some embodiments of the present disclosure. The information muting system 102 includes or is otherwise in communication with one or more hardware processors such as a processor(s) 202, at least one memory such as a memory 208, and an I/O interface 204. The processor 202 (hardware processor), the memory 208, and the I/O interface(s) 204 may be coupled by a system bus such as a system bus 206 or alike mechanism. The memory 208 further may include modules 210.

The hardware processor(s) 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 208 and communicate with the modules 210, internal or external to the memory 208, for triggering execution of functions to be implemented by the modules 210.

The I/O interface(s) 204 of the information muting system 102 may include a variety of software and hardware interfaces, for example, a web interface, a graphical user interface and the like. The I/O interface(s) 204 may include a variety of software and hardware interfaces, for example, interfaces for peripheral device(s), such as a keyboard, a mouse, an external memory and a printer and a display. The I/O interface(s) 204 may enable the information muting system 102 to communicate with other devices, such as the computing device 104, web servers and external databases (such as the repository 112, if external to the information muting system 102). The I/O interface(s) 204 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 204 may include one or more ports for connecting a number of computing systems with one another or to another server computer. The I/O interface(s) 204 may include one or more ports for connecting a number of devices to one another or to another server.

The memory 208 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types.

The modules 210 can be an Integrated Circuit (IC), external to the memory 208 (not shown), implemented using a Field-Programmable Gate Array (FPGA) or an Application-Specific Integrated Circuit (ASIC). The names of the modules of functional block within the modules 210 referred herein, are used for explanation and are not a limitation. Further, the memory 208 can also include the repository 112 (internal to the information muting system 102 as shown in FIG. 2). The modules 210 may include computer-readable instructions that supplement applications or functions performed by the information muting system 102. The repository 112 may store data that is processed, received, or generated as a result of the execution of one or more modules in the module(s) 210.

In an embodiment, the modules 210 includes a conversion module 212, a classified word detection module 214, a subwords module 216 and a fuzzy muting module 218, implementing functions of the information muting system 102. The conversion module 212 of the information muting system 102 can be configured to convert the received audio signal into textual representation utilizing a speech recognition engine which is capable of transcribing entire speech signal to text or an acoustic keyword search engine which is capable of spotting specific keywords in the audio signal without requiring to transcribe the complete the speech signal The classified word detection module 214 of the information muting system 102 processes the textual representation to identify a plurality of classified words. The subwords module 216 of the information muting system 102 identifies the subwords from each classified word among the plurality of classified words. Further, the fuzzy muting function module 218 of the information muting system 102 mutes the segments of subwords associated with each classified word with an appropriate degree of obfuscation signal.

Figure 3A:
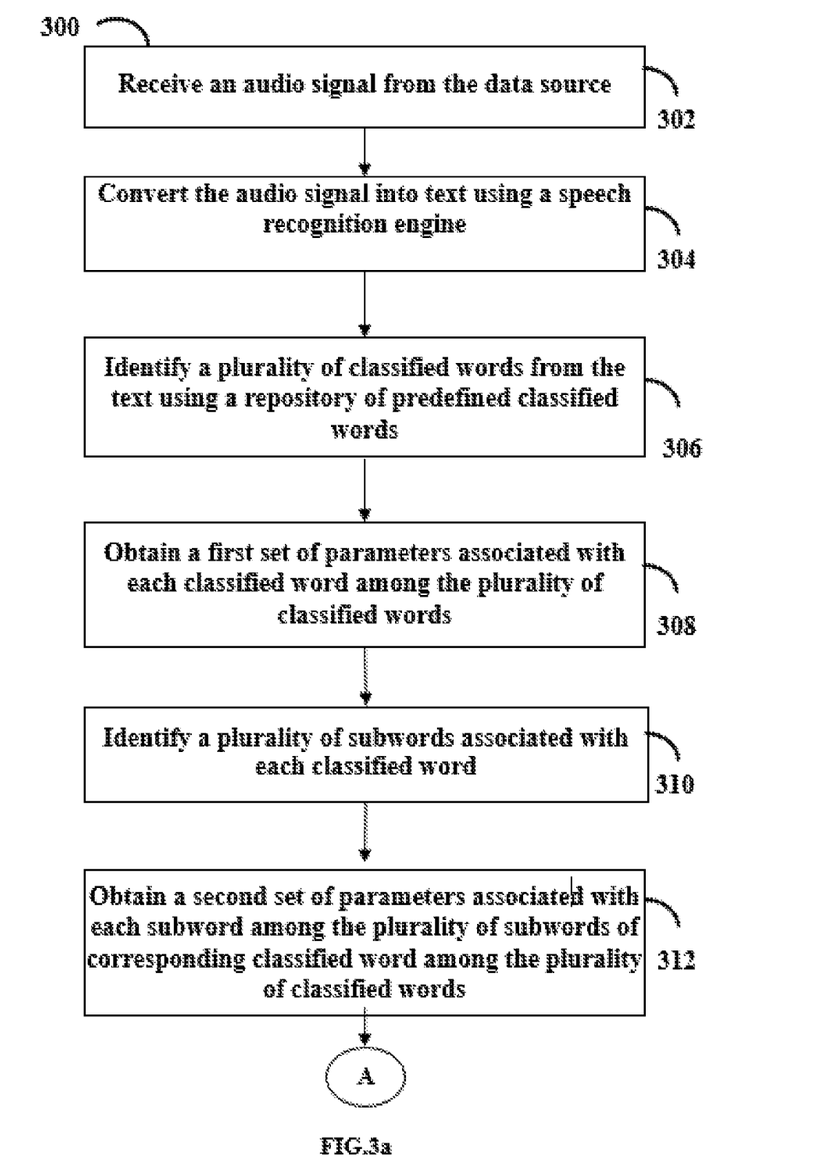
FIG. 3a and FIG. 3b illustrates a flow diagram depicting a method for muting classified information from an audio signal, in accordance with some embodiments of the present disclosure.
Figure 3B:
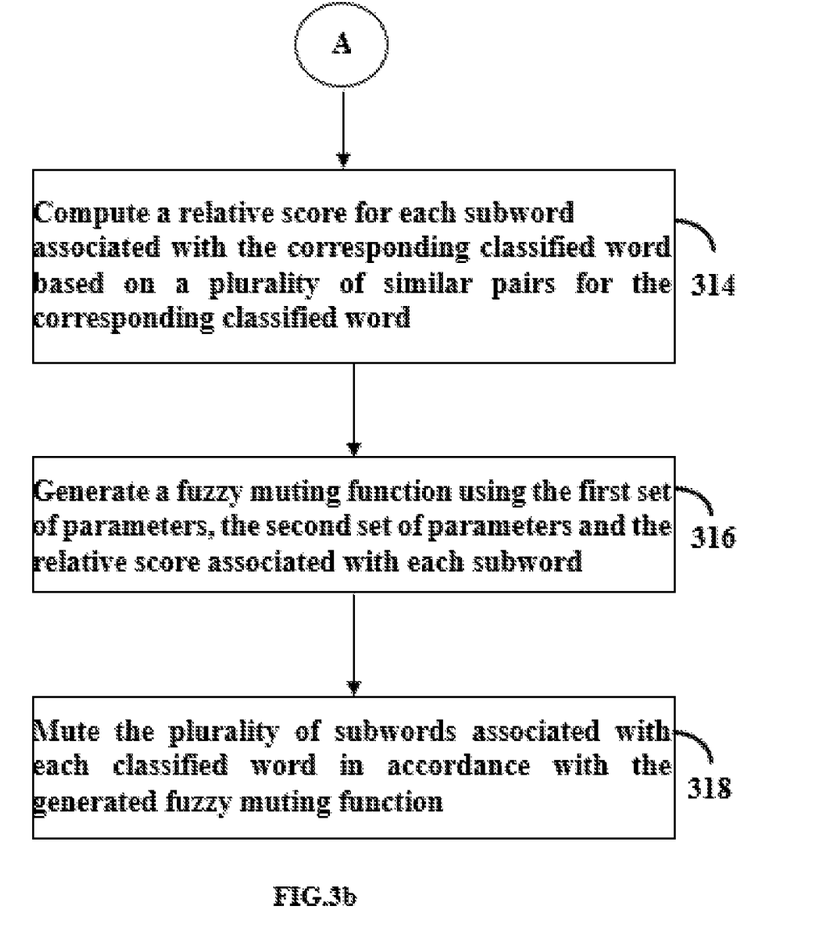

FIG. 3a and FIG. 3b illustrates a flow diagram depicting a method for muting classified information from the audio signal, in accordance with some embodiments of the present disclosure. In an embodiment, at step 302, the method 300 includes allowing the information muting system 102 to receive the audio signal from the data source 106. At step 304, the method 300 includes allowing the information muting system 102 to convert the audio signal into text or textual representation using a speech recognition engine associated with the conversion module (212).

At step 306, the method 300 includes allowing the information muting system 102 to identify the plurality of classified words from the text using a repository of predefined classified words. A list of classified words are predefined into a classified word repository, for example herein the repository 112. The classified word repository includes standard format of all possible classified words such as a social security number (SSN), a bank account number, a credit card number, a telephone number and a like. For example, considering an audio signal of interaction between a customer and an external agent as provided in Table 1 below,

TABLE 1

Textual representation of an audio signal

External Agent: /How are you today/
Customer: /I want to know my credit card dues/
External Agent: /Can I have your name please/
Customer: /Ralf Edison/
External Agent: /Mr. Edison, Can I confirm your mobile number? /
Customer: /Sure it is 'nine double one nine six two eight nine zero'/
External Agent: /Thank you. Please confirm your Credit Card Number/
Customer: My credit card number is 'five three one six - nine two eight zero − four two five nine − six three one nine'/
External Agent: / Thank you Mr. Edison/

The external agent is acquiring customer's information such as 'Please confirm your credit card number', the format of credit card number is 16 digits and is represented as shown 'WWWW-XXXX-YYYY-ZZZZ'. The classified word detection module 214 of the information muting system 102 analyses the output of speech recognition engine to detect the occurrence of at least one classifier word representing the classified information. Here, the occurrence of classifier word is 'Credit card number' from the example of Table. 1. Using the classifier word repository, format of classifier word is validated.

At step 308, the method 300 includes allowing the information muting system 102 to obtain a first set of parameters associated with each classified word among the plurality of classified words. The first set of parameters comprises, a time stamp of classifier word, a time duration of classifier word and a confidence score of the classifier word. To obtain the time stamp parameter, for the given segments of validated classifier word, time stamp starts when the time occurrence of validated classifier word begins, and ends when the time occurrence of validated classifier word stops. This temporal information with start time of validated classifier word and the end time of the validated classifier word is captured as the time stamp parameter for the classifier word. Further, to obtain the time duration parameter, for the given segments of validated classifier word the time duration may be referred as the length of the segments of validated classifier word. The time duration is obtained from the distance between start time and end time of the time stamp parameter. This time duration or length is captured as the time duration parameter for the classifier word. Furthermore, the confidence score for the segments of validated classifier word is obtained from the measure of confidence of validated classifier word based on the speech recognition engine.

At step 310, the method 300 includes allowing the information muting system 102 to identify the plurality of subwords associated with each classified word. The expression subword refers to units, which constitute a word. Phones and syllables are examples of subword units. In some languages subword units are substrings of written spelling of the word/phrase whereas in other languages, like English, the subword units are evident in the phonetic transcription of the word/phrase. Generally, representing vocabulary in English language, the sound or phonetic represented by "T" and "D" are chosen to be the same subword unit. Though the words (like "BAD" and "BAT") are varied, the utterance of word by the customer depends on geographical areas and seems similar as the sounds (like "BAD" and "BAT") could never be acoustically distinguished. With reference to the interaction as described above in the Table 1, the identified classified words are decomposed into subwords based on its acoustics transcripts. The credit card number mentioned as 'three one six-nine two eight zero-four two five nine-six three one nine' is depicted and uttered as 'thirty one sixty two eighty forty two fifty nine sixty three nineteen'. Each of the classified word is decomposed into subword units. The segments of each subword is captured to obtain a second set of parameters.

At step 312, the method 300 includes allowing the information muting system 102 to obtain the second set of parameters associated with each subword among the plurality of subwords of corresponding classified word among the plurality of classified words. The second second set of parameters comprises a time stamp of each sub word, a duration of each subword occurred and a subword confidence score associated with each classified word. To obtain the time stamp parameter, for the given subword, time stamp starts when the time occurrence of subword begins and ends when the time occurrence of subword stops. This temporal information with start time of subword and the end time of the subword is captured as the time stamp parameter for the subword. Further, to obtain the time duration parameter, for the given segments of subword the time duration may be referred as the length of the segments of subword. The time duration is obtained from the distance between start time and end time of the time stamp parameter. This time duration or length is captured as the time duration parameter for the subword. Furthermore, the confidence score for the segments of subword associated with each classified word is obtained from the measure of confidence of validated classifier word based on the speech recognition engine.

At step 314, the method 300 includes allowing the information muting system 102 to compute a relative score for each subword associated with the corresponding classified word based on a plurality of similar pairs for the corresponding classified word. The lexicon language repository of the repository 112 is utilized to obtain a list of words that are phonetically similar to each of the classified word. Each subword of the classifier word is paired with the phonetically similar subword to generate the plurality of similar pairs. The total count for the plurality of similar pairs is obtained. The similar pairs are grouped into a cluster based on a predefined cluster member similarity. The steps utilized in computing relative score of subword that includes initially classifier word $c_{w1}$ is decomposed into subword (sw1, sw2 . . . swn) to extract all possible phonetically similar words (ps1, ps2, ps3 . . . psn) for each subword of the classifier word utilizing the lexicon language repository. Further, the plurality of similar pairs is obtained by pairing each subword of the classifier word with the phonetically similar words to obtain the count of all word level similar pairs. Then, the similar pairs are clustered based on a predefined cluster member similarity. Furthermore, a relative score is computed for each subword by determining the ratio of count of cluster members (subword level similar pairs) for each subword to the count of all word level similar pairs.

At step 316, the method 300 includes allowing the information muting system 102 to generate the fuzzy muting function, mathematically represented as $f_m$, using the first set of parameters, the second set of parameters and the relative score associated with each subword. In an embodiment, the fuzzy muting function for classified word is a function of Gaussian window function as provided in equation 1 below, $$f_m(ts_w, td_w, sc_w) = \exp^{\frac{-1}{2}} \left( \frac{t - (td_w - 1)/2}{sc_w^2 (td_w - 1)/2} \right)^2 \quad (1)$$

Figure 5A:
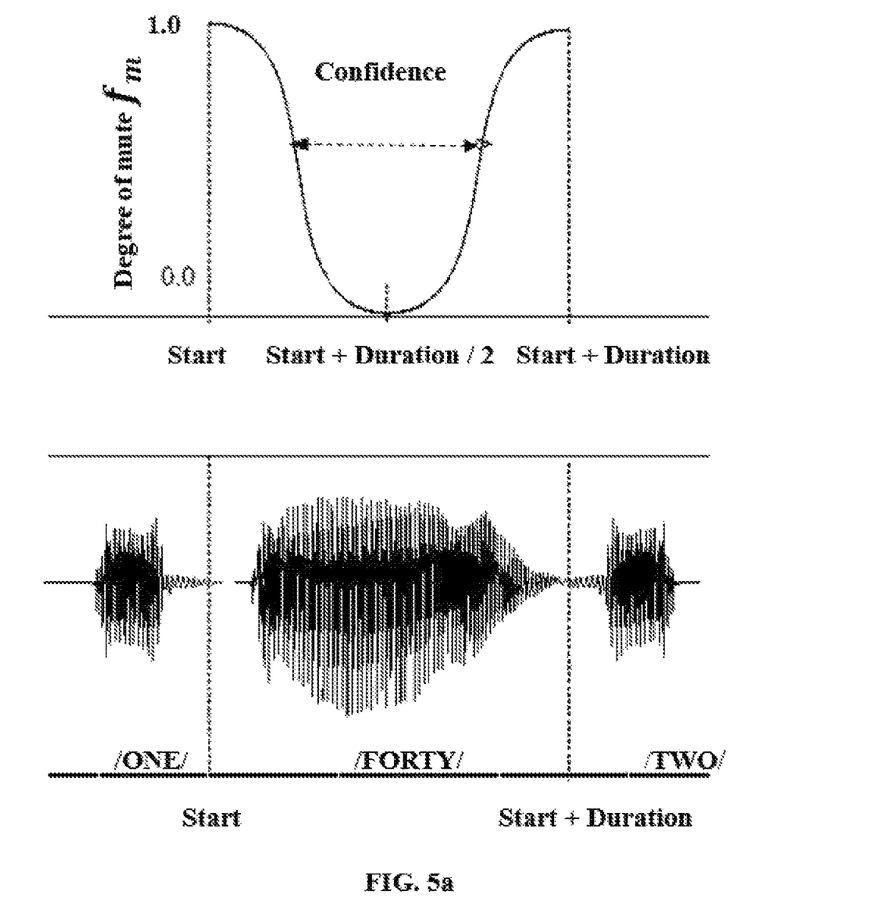
FIG. 5a and FIG. 5b illustrates a graphical representation of muted classified information generated for the example audio signal of FIG. 4, audio signal, in accordance with some embodiments of the present disclosure.
Figure 5B:
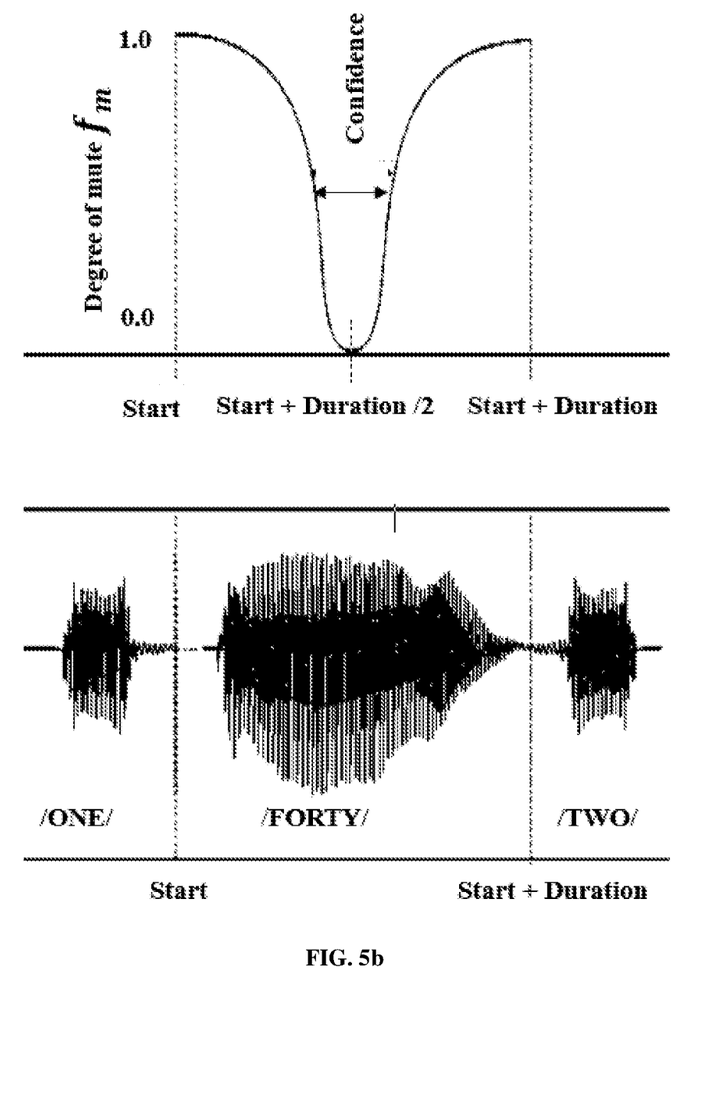

Where, $f_m$ is a function of classifier word $f_m \alpha(sc_w, td_w)$
 $ts_w$ is the start time of the word
 $td_w$ is the duration of the word
 $sc_w$ is the confidence score of the word
 and $0 \le t \le td_w$ This particular fuzzy muting function is represented graphically as shown in FIG. 5a and FIG. 5b. When the confidence score $sc_w$ of the fuzzy muting function of equation 1 has higher degree of mute then most part of the classified words is muted between the interval $(ts_w, ts_w + td_w)$ as shown in FIG. 5a. Similarly, when the confidence score is low it turns the form of peaky Gaussian then only a small portion of audio around $(ts_w, td_w/2)$ is muted and the rest remains same as shown in FIG. 5b.

In another embodiment, the fuzzy muting function for each subword of the classified word is a Gaussian window function as provided in equation 2 below, $$f_m(sc_p, td_w, \{rs_p, td_p\}, d) = \exp^{\frac{-1}{2}} \left( \frac{t - \left(\frac{td_p - 1}{2}\right) * \left(\frac{1 + rs_p}{2}\right)^2}{sc_p^2 * \left(\frac{td_p - 1}{2}\right)} \right)^2 \quad (2)$$

Where, $f_m$ is a function of subword associated with each classified word,
 '$sc_p$' is the confidence score of each subword,
 '$td_p$' is the time duration of each subword, and
 '$rs_p$' is the relative score of subword.
As per equation 2, the subword unit is heavily muted if it has a high confidence score and a high relative score. The degree of muting reduces if either the confidence score or the relative score of the subword unit reduces.

At step 318, the method 300 includes allowing the information muting system 102 to mute the plurality of subwords associated with each classified word in accordance with the generated fuzzy muting function. The table 2 below provides the audio signal in muted form.

TABLE 2

| Audio signal muted |
|---|
| External Agent: /How are you today/ |
| Customer: /I want to know my credit card dues/ |
| External Agent: /Can I have your name please/ |
| Customer: /Ralf Edison/ |
| External Agent: /Mr. Edison, Can I confirm your mobile number? / |
| Customer: /Sure it is 'nine double one nine nine six two eight nine zero'/ |
| External Agent: /Thank you. Please confirm your Credit Card Number/ |
| Customer: My credit card number is '**** _ **** _ **** _ ****'/ |
| External Agent: / Thank you Mr. Edison/ |

Figure 4:
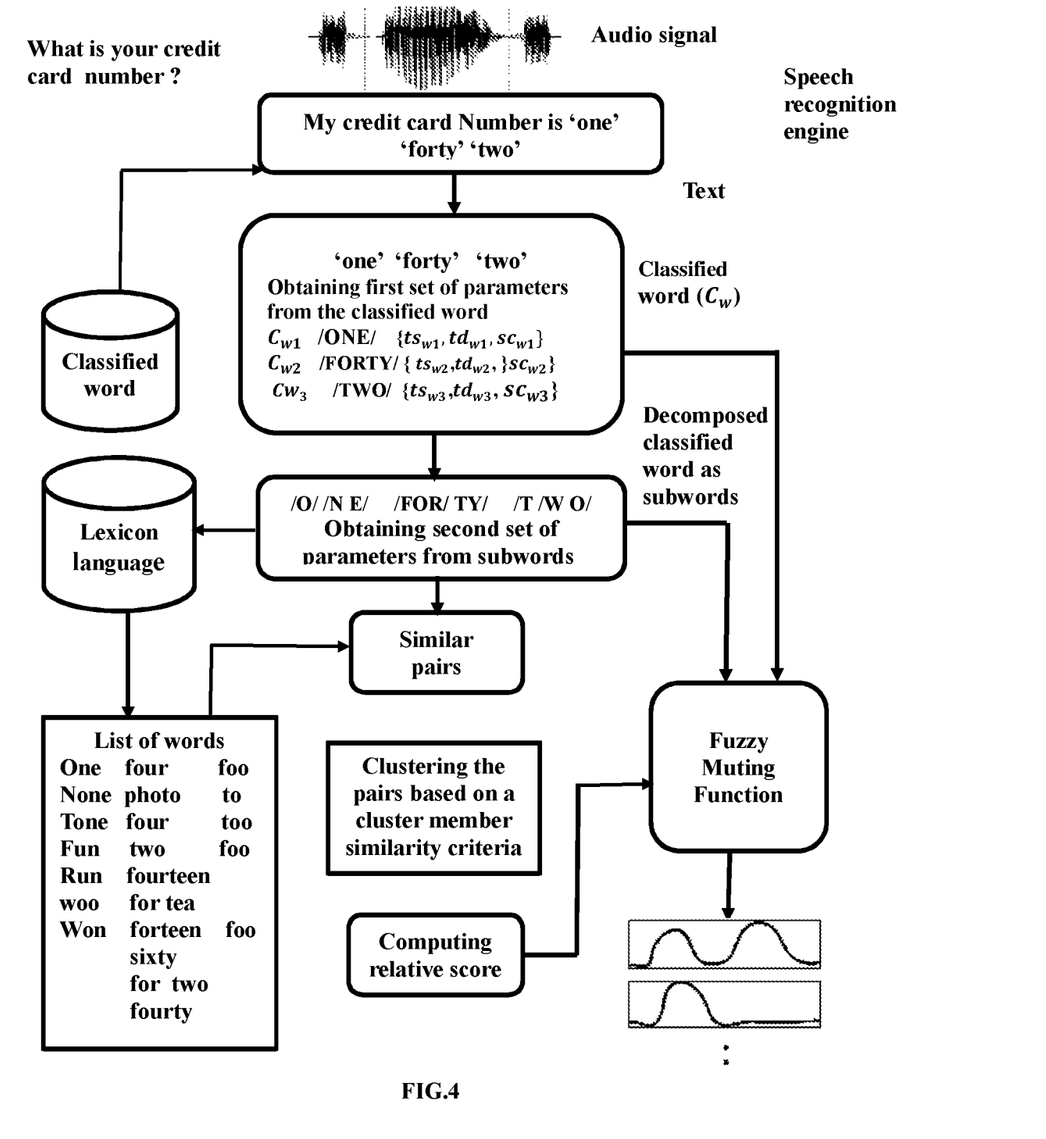
FIG. 4 is an example illustrating muting of classified information from an example audio signal, in accordance with some embodiments of the present disclosure.

FIG. 4 is an example illustrating muting of classified information from an example audio signal, in accordance with some embodiments of the present disclosure. Considering an audio signal received from the data acquisition unit 106 of the information muting system 102. The received audio signal is converted into textual representation as (credit card number as /one/forty/two) using the speech recognition engine associated with the conversion module (210). The classified word detection module of the information muting system identifies the occurrence of classified word from the textual representation utilizing the classified word repository associated with the repository 112. The credit card number /one/forty/two/, for each of the classified word the first set of parameters are obtained that includes a time stamp of classified word, a time duration of classified word and the confidence score of classified word $\{ts_w, td_w, sc_w\}$. The classified word is decomposed into subword units to detect the spoken term. Essentially, the subword of the classified word may be represented as /o/ne/for/ty/t/w/o. Here, the subword 'One' has one syllable (/v ah n/) or three phones (v, ah, n). Either of them can be subwords. 'Forty' has two syllables (/f oh/ /t y/) or four phones (f, oh, t, y). 'Two' has one syllable (/t uw/) or two phones (t, uw). So syllable level subword units of /one forty two/ are: /v ah n/ /f oh/ /t y/ /t uw/. The second set of parameters that includes the time stamp of subword, the time duration of subword and the confidence score are obtained $\{ts_p, td_p, sc_p\}$.

In an embodiment, the relative score for each subword /o/ne /for/ty /t/w/o is computed by obtaining a list of words that are phonetically similar to /o/ne/for/ty /t/w/o using the lexicon language repository associated with the repository 112. The obtained list of phonetically similar words may be as mentioned in table 3 below:

TABLE 3

| List of words from Lexicon language /one/forty/two/ | | |
| --- | --- | --- |
| One | forty | two |
| None | photo | to |
| Ton | four tea | too |
| Fun | Four two | foo |
| Run | fourteen | woo |
| Won | | |
| | Sixty | |
| | for tea | |
| | For tea to | |

Each phonetically similar word is obtained with the each of the subword using edit distance 'd'. The subword unit is paired with the obtained lexicon word to obtain a plurality of similar pairs (N). Further, the count of each similar pairs are obtained based on the subwords /o/ne/for/ty/t/w/o. The obtained relative pairs are clustered based on a predefined cluster member criteria, wherein each cluster member criteria for /for/ty may be obtaining the similar words that are phonetically similar to /for/ (n1) and /ty/ (n2). Then, the relative score is computed for each subword by determining the ratio of count $n_p$ of cluster members for each subword to the count of all word level relative pairs (N). The fuzzy muting function is generated using the first set of parameters, the second set of parameters and the relative score associated with each subword. Then, the plurality of subword associated with the classified word is muted in accordance with the generated fuzzy muting function with an appropriate degree of obfuscation signal.

FIGS. 5a and 5b illustrates a graphical representation of muted classified information generated for the example audio signal of FIG. 4, audio signal, in accordance with some embodiments of the present disclosure. The fuzzy muting function is represented graphically when the confidence score $sc_w$ of the fuzzy muting function as characterized in equation.1. For higher value of confidence score, the shape of the Gaussian is flat. Subsequently, each classified word among the plurality of classified words are muted between the interval $(ts_w, ts_w+td_w)$ as shown in FIG. 5a. Similarly, for lower value of confidence score the form of peaky Gaussian is peaky. Subsequently, the degree of mute for the classified word among the plurality of classified words are muted around the interval $(ts_w, td_w/2)$. The remaining portion of the audio signal is not disturbed as shown in FIG. 5b.

Figure 6:
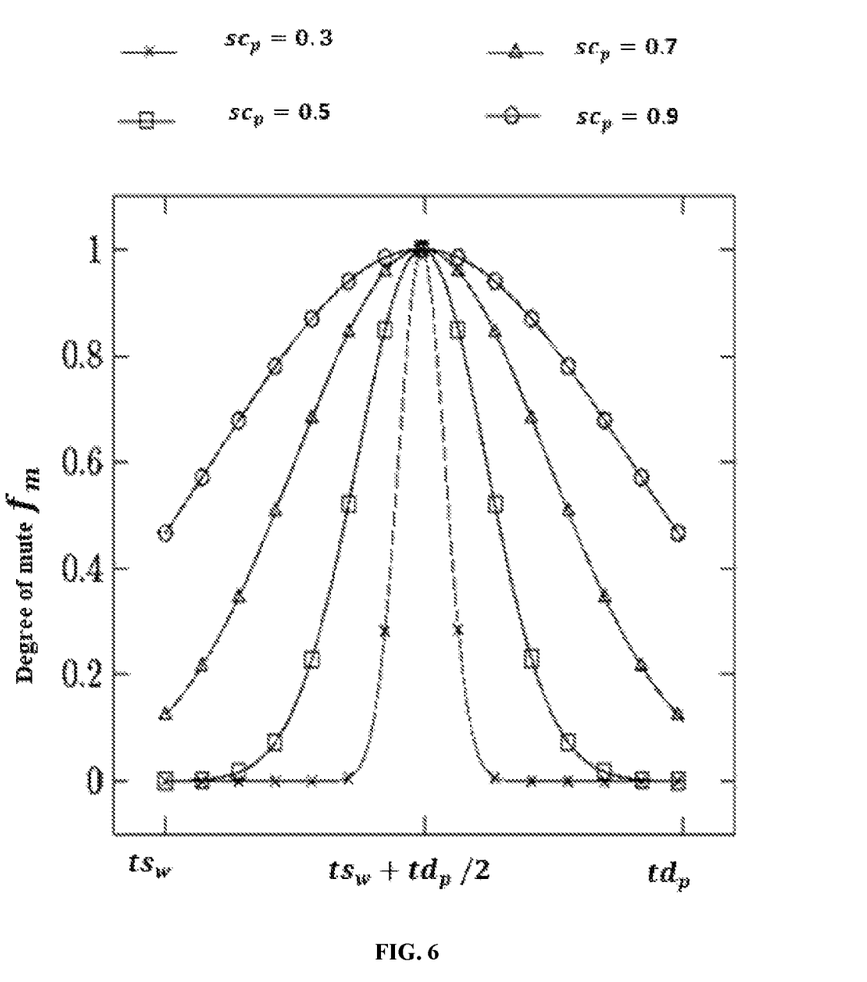
FIG. 6 illustrates a graphical representation illustrating the classified information from the audio signal of FIG. 4 being muted using a plurality of levels of confidence score, in accordance with some embodiments of the present disclosure.

FIG. 6 illustrates a graphical representation illustrating the classified information from the audio signal of FIG. 4 being muted using a plurality of levels of confidence score represents. This graphical representation exemplifies between diverse degree of mute values which is a derivate of fuzzy muting function and the time duration of each subword associated with each classified words. Here, the varying values of confidence score $sc_w$ are obtained for each subword and simultaneously fuzzy muting function are derived. The subword with lower confidence score is muted with lower degree of mute denoted by '0' where the plotting starts. The Gaussian peak slopes down when the confidence score is lower and muted with lower degree of mute and its time duration is denoted by $td_p$.

The disclosed fuzzy muting approach provides advantage over the existing muting approaches. As compared to existing muting approaches, fuzzy muting can perform even when the speech recognition/keyword spotting system is imperfect or erroneous. It is well known that automatic speech recognition systems and acoustic keyword search systems are not perfect and they can incorrectly hypothesize a word in place of another spoken word. Conventional approaches for muting classified information in audio employ such speech recognition/keyword spotting systems and use the recognition confidence score as a measure of confidence of occurrence of the classified word. To take a decision on whether this occurrence should be muted, existing muting systems simply compare the recognition confidence score to a preset threshold. However, if words representing classified information are hypothesized with a confidence score lower than the pre-set threshold, then these classified information words are left un-muted. In contrast to these existing systems, the disclosed fuzzy muting approach does not rely on a threshold and mutes every hypothesized instance of classified information using the fuzzy muting function. The fuzzy muting function is advantageous since it will not completely leave out a classified information detected with low confidence score, and also will not completely mute false alarms of classified information.

Further, the sub-word level fuzzy muting provides specific advantages. For example, archives of audio recordings like call conversations are typically used to (a) monitor/regulate the performance of call center agents, and to (b) train speech recognition and other algorithms for performing call center analytics. Muting words and phrases in these recordings leads to missing information or gaps in the recorded data. Sub-word level fuzzy muting can make use of domain specific confusion pairs (or similar sounding words) and mute only certain sub-word unit(s) such that after muting the classified information word/phrase will sound more similar to another domain related word. This alleviates the problem of missing information and gaps when using 'information muted' audio archives. Thus, compared to existing muting approaches, the disclosed fuzzy muting can perform even when the speech recognition system is imperfect and prone to errors. Thus method disclosed is more accurate and hence reliable. As compared to existing muting approaches, fuzzy muting can perform even when the speech recognition system is imperfect and prone to errors.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other related forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for muting classified information in an audio signal, the method comprises:
   receiving, an audio signal from the data source;
   converting, the audio signal into text using a speech recognition engine;
   identifying, a plurality of classified words from the text using a repository of predefined classified words;
   obtaining, a first set of parameters associated with each classified word among the plurality of classified words;
   identifying, a plurality of subwords associated with each classified word;
   obtaining, a second set of parameters associated with each subword among the plurality of subwords of corresponding classified word among the plurality of classified words;
   computing, a relative score for each subword associated with the corresponding classified word based on a plurality of similar pairs for the corresponding classified word, wherein computing the relative score for each subword of the corresponding classified word comprises:
   obtaining, a list of words phonetically similar to the corresponding classified word using a language lexicon;
   obtaining, the plurality of similar pairs by pairing each subword in the obtained list of words with the classified words at subword level;
   determining, a count of the plurality of word level similar pairs;
   clustering, the plurality of similar pairs into a plurality of clusters based on a predefined cluster criteria for each subword associated with the corresponding classified word, wherein each cluster among the plurality of clusters comprises a set of subword level similar pairs; and
   determining, the relative score for each subword associated with the corresponding classified word, wherein the relative score is a ratio of plurality of clustered subword level similar pairs based on a predefined cluster criteria to the count of the plurality of word level similar pairs;
   generating, a fuzzy muting function using the first set of parameters, the second set of parameters and the relative score associated with each subword; and
   muting, the plurality of subwords associated with each classified word in accordance with the generated fuzzy muting function.

2. The method as claimed in claim 1, wherein the first set of parameters comprises a time stamp of each classified word, a duration for each classified word occurred and a confidence score of each classified word.

3. The method as claimed in claim 1, wherein the second set of parameters comprises a time stamp of each subword, a duration for which each subword occurred and a subword confidence score associated with each classified word.

4. An information muting system (102) for muting classified information in an audio signal, wherein the information muting system (102) comprises:
   a processor (202);
   an Input/output (I/O) interface (204); and
   a memory (208) coupled to the processor (202), the memory (208) comprising:
     a conversion module (212) is configured to convert the audio signal into text using a speech recognition engine;
     a classified word detection module (214) is configured to:
       identify a plurality of classified words from the text using a repository of predefined classified words; and
       obtain a first set of parameters associated with each classified word among the plurality of classified words;
     a subwords module (216) is configured to:
       identify a plurality of subwords associated with each classified word;
       obtain a second set of parameters associated with each subword among the plurality of subwords of corresponding classified word among the plurality of classified words; and
       compute a relative score for each identified subword associated with the classified word based on a plurality of similar pairs for the classified word, wherein the subwords module (216) is configured to compute the relative score for each subword of the corresponding classified word, by:
         obtaining, a list of words phonetically similar to the corresponding classified word using a language lexicon;
         obtaining, the plurality of similar pairs by pairing each subword in the obtained list of words to the classified words at subword level;
         determining, a count of the plurality of word level similar pairs;
         clustering, the plurality of similar pairs into a plurality of clusters based on a predefined cluster criteria for each subword associated with the corresponding classified word, wherein each cluster among the plurality of clusters comprises a set of subword level similar pairs; and
         determining, the relative score for each subword associated with the corresponding classified word, wherein the relative score is a ratio of plurality of clustered subword level similar pairs based on a predefined cluster criteria to the count of the plurality of word level similar pairs;
     a fuzzy muting module (218) is configured to:
       generate a fuzzy muting function using the first set of parameters, the second set of parameters and the relative score associated with each subword; and
       mute the plurality of subwords associated with each classified word in accordance with the generated fuzzy muting function.

5. The information muting system (102) as claimed in claim 4, wherein the first set of parameters comprises a time stamp of each classified word, a duration of each classified word occurred and a confidence score of each classified word.

6. The information muting system (102) as claimed in claim 4, wherein the second set of parameters comprises a time stamp of each subword, a duration of each subword occurred and a subword confidence score associated with each classified word.

7. One or more non-transitory machine readable information storage mediums comprising one or more instructions which when executed by one or more hardware processors perform actions comprising:
   receiving an audio signal from the data source;
   converting the audio signal into text using a speech recognition engine;
   identifying a plurality of classified words from the text using a repository of predefined classified words;
   obtaining a first set of parameters associated with each classified word among the plurality of classified words;
   identifying a plurality of subwords associated with each classified word;
   obtaining a second set of parameters associated with each subword among the plurality of subwords of corresponding classified word among the plurality of classified words;
   computing a relative score for each subword associated with the corresponding classified word based on a plurality of similar pairs for the corresponding classified word, wherein computing the relative score for each subword of the corresponding classified word comprises:
     obtaining a list of words phonetically similar to the corresponding classified word using a language lexicon;
     obtaining the plurality of similar pairs by pairing each subword in the obtained list of words with the classified words at subword level;
     determining a count of the plurality of word level similar pairs;
     clustering the plurality of similar pairs into a plurality of clusters based on a predefined cluster criteria for each subword associated with the corresponding classified word, wherein each cluster among the plurality of clusters comprises a set of subword level similar pairs; and
     determining the relative score for each subword associated with the corresponding classified word, wherein the relative score is a ratio of plurality of clustered subword level similar pairs based on a predefined cluster criteria to the count of the plurality of word level similar pairs;
   generating a fuzzy muting function using the first set of parameters, the second set of parameters and the relative score associated with each subword; and
   muting the plurality of subwords associated with each classified word in accordance with the generated fuzzy muting function.

8. The one or more non-transitory machine readable information storage mediums of claim 7, wherein the first set of parameters comprises a time stamp of each classified word, a duration for each classified word occurred and a confidence score of each classified word.

9. The one or more non-transitory machine readable information storage mediums of claim 7, wherein the second set of parameters comprises a time stamp of each subword, a duration for which each subword occurred and a subword confidence score associated with each classified word.

\* \* \* \* \*